Aug. 20, 1935.   W. A. LIPPINCOTT   2,011,585
METHOD OF AND APPARATUS FOR FORMING CYLINDERS
Filed May 10, 1932    2 Sheets-Sheet 1
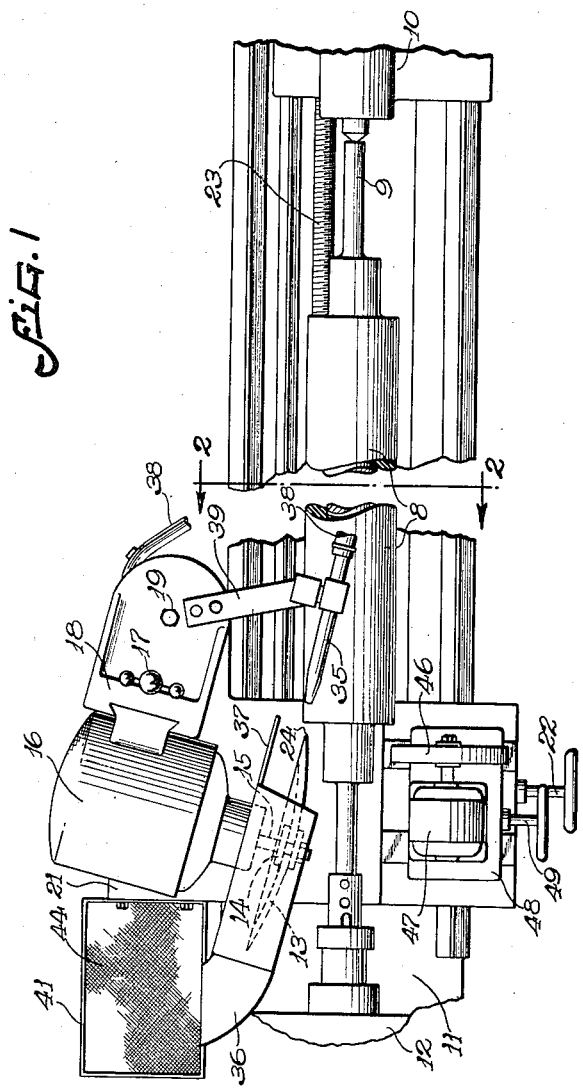
Inventor
Wells A. Lippincott
By Chindahl, Parker & Cauley
Attorneys

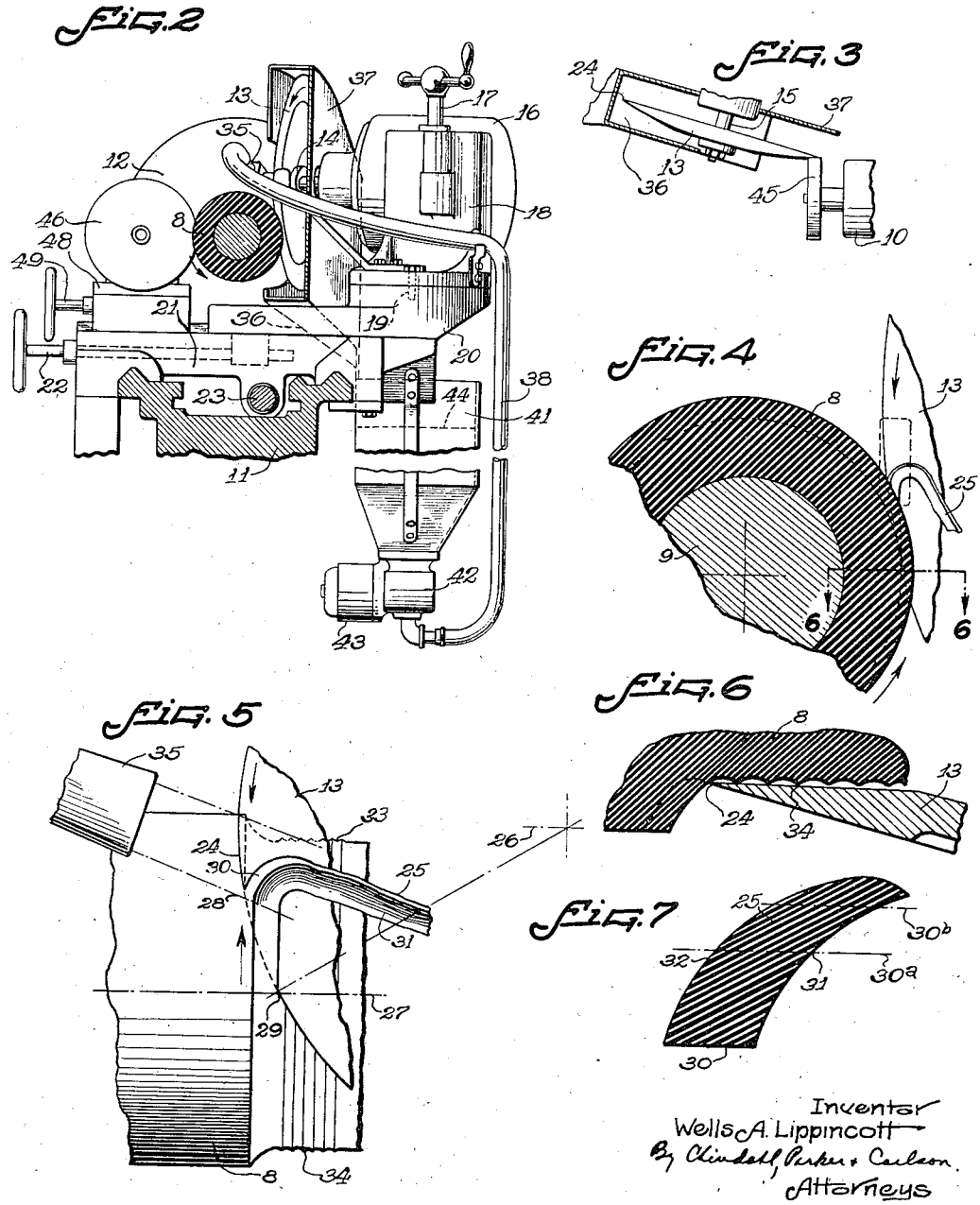

Patented Aug. 20, 1935

2,011,585

UNITED STATES PATENT OFFICE 2,011,585

METHOD OF AND APPARATUS FOR FORMING CYLINDERS

Wells A. Lippincott, Oak Park, Ill., assignor to Ideal Roller & Manufacturing Company, Chicago, Ill., a corporation of Illinois Application May 10, 1932, Serial No. 610,514

37 Claims. (Cl. 18—2)

This invention relates generally to the formation of cylindrical surfaces on rollers such as are used in printing presses and composed of rubber or like material. More particularly, the invention relates to the trimming of such rollers.

According to present practice, rubber rollers for use on printing presses are finished with a true cylindrical surface by trimming to the desired size with grinding wheels and finally buffing with fine abrasive surfaces. Owing to the softness and pliability of the rubber, the removal thereof by abrasion is a slow process usually requiring as many as twenty heavy and light cuts with coarse and fine grain abrasive taken at slow speeds and in different machines. As a result, the time and labor involved in reducing a roller to the desired exact diameter and with a smooth surface is increased unnecessarily and the cost of manufacture accordingly high.

The primary object of the present invention is to reduce the cost of producing rollers composed of rubber or like material through the provision of a novel method of and machine for trimming the roller to the desired uniform diameter in a single longitudinal cut made at high speed.

In carrying out this object, the invention contemplates the use of a power driven knife edge positioned to enter the periphery of the roller in a manner such that, during rotation of the roller and advancement of the cutter longitudinally thereof, a thin ribbon-like helix will be sliced from the roller leaving a surface of uniform diameter which may be reduced readily to the desired smoothness.

The invention also resides in the novel manner of mounting and feeding the cutter so that a clean cut will be taken without the formation of a feather edge on the strip of material removed leaving a surface of uniform diameter which may be buffed readily to the desired smoothness.

Another object is to provide a novel method of and apparatus for removing the ribbon-like cuttings so as to avoid clogging of the machine.

Still another object is to combine, in a trimming machine of the above character, a mechanism for enabling the reduced surface to be buffed during the trimming operation.

Other objects and advantages of the invention will become apparent from the following detailed description taken in connection with the accompanying drawings, in which Figure 1 is a fragmentary plan view of a machine for trimming a rubber cylinder in accordance with the present invention.

Fig. 2 is a sectional view taken along the line 2—2 of Fig. 1.

Fig. 3 is a fragmentary view similar to Fig. 1 showing the manner in which the cutter is set preparatory to trimming the roller.

Fig. 4 is an enlarged sectional view taken at a point in advance of the cutter.

Fig. 5 is a fragmentary side elevational view of the roller and cutter in the course of trimming.

Fig. 6 is a sectional view taken along the line 6—6 of Fig. 4.

Fig. 7 is a cross-sectional view of the ribbon formed in the course of trimming, the section being shown on an enlarged scale.

In the exemplary form shown in the drawings, the roller or cylinder to be trimmed comprises a vulcanized rubber sleeve 8 of substantial thickness carried by a shaft 9. During trimming the roller is rotated on its longitudinal axis and for this purpose is supported at one end by a conventional tail-stock 10 on a lathe bed 11. The other end is concentric with and detachably coupled to a headstock 12 rotated by suitable power means (not shown).

Preferably, the cutter comprises a metal disk 13 having a hub 14 fast upon the shaft 15 of an electric motor 16 by which the cutter is driven at high speed, approximately 3600 R. P. M. in the present instance. The motor is supported for vertical adjustment through the medium of a screw 17 threading onto a bracket 18 swingable about a pivot 19 and adapted to be clamped to a table 20 mounted on a carriage 21 which is movable transversely of the roller axis in either direction by turning a screw shaft 22. The carriage is supported by the bed 11 for movement longitudinally of the roller and is arranged to be fed in this direction at a uniform rate as by a power driven feed screw 23. With the motor thus mounted, it will be apparent that the cutter may be adjusted readily to vary the angle between the cutter and roller axes, the height of the cutter, and the depth to which the cutter will enter the periphery of the cylinder to be trimmed.

Good results have been obtained with the carriage traveling longitudinally of the roller at a rate of approximately twenty inches per minute and the roller rotating through approximately eight revolutions during one inch of travel of the carriage.

The cutter has a circular knife edge 24 disposed in a plane perpendicular to the shaft 15 and preferably having one flat side to facilitate sharpening. The size of the roller to be trimmed is a factor in determining the size of the cutter to be used. For example, a cutter eleven inches in diameter is preferably employed for trimming a roller approximately four inches in diameter although five-inch rollers may be trimmed with a cutter of this size. For rollers of substantially less diameter, a larger cutter should be employed while a smaller cutter is preferred for rollers of larger diameters.

The present invention contemplates mounting the cutter in a manner such that a short segmental portion thereof will intersect the periphery of the roller to be trimmed along a helical path during advance of the cutter along the roller with the latter and the cutter rotating in the directions indicated by the arrows in Figs. 2 and 5 and during such movement will slice a strip or ribbon 25 from the rubber thereby reducing the roller to the desired uniform diameter. To this end, the cutter is positioned with its leading edge portion spaced from the roller axis a distance corresponding to the diameter to which the roller is to be finished and with its axis extending transversely of but offset from the roller axis so that the cutter axis moves in a plane 26 parallel to a horizontal plane 27 through the roller axis. Because of this offset relation of the cutter and roller axes, the knife edge 24 engages the roller surface at a point 28 on the untrimmed diameter and passes out of contact with the rubber at a point 29 which, it will be observed, is on the diameter to which the roller is to be reduced. The points at which the cutter enters and leaves the rubber are thus spaced axially and radially of the roller and both of the points are disposed between the planes 26 and 27 with the point 29 adjacent the plane 27.

To obtain the above relation, consideration must be given to the depth of the cut to be taken and to the size of the cutter with respect to the size of the roller. For the amount of rubber which ordinarily is removed in trimming printing press rollers, the desired relation is obtained with the cutter and roller of the sizes above described by locating the axis of the cutter at such a distance from the roller axis that a radius of the cutter through the point 29 intersects the plane 27 at an angle of approximately 30 degrees.

To afford proper clearance between the cutter blade and the trimmed portion of the roller, the shaft 15 preferably is inclined as shown in Figs. 1 and 3, the angle between the roller and the plane of rotation of the knife edge being approximately 15 degrees in the present instance. The amount of material removed during the cutting operation is determined by the distance between the roller axis and that portion of the cutter which enters the rubber. This distance is established preparatory to a cutting operation by setting the table 20 through the medium of the hand screw 22.

With the cutter positioned as above described, the strip 25 formed during the trimming operation is of triangular cross-section having a substantially straight uncut surface 30 equal in width to the distance through which the cutter is advanced during each revolution of the roller and intersecting two slightly curved surfaces 31 and 32 which taper gradually toward each other and intersect at a sharper acute angle. When a relatively deep cut is taken, the strip 25 would have a cross-sectional shape as shown on an enlarged scale in Fig. 7. For shallower cuts, the surface 30 might be along the lines 30ª and 30ᵇ, the surfaces 31 and 32 being correspondingly narrower.

Thus, it will be seen that the width and angular relation of the surfaces 31 and 32 are determined by the depth of cut which will vary with different rollers and also during trimming of any particular roller, if the untrimed surface of the latter is not exactly concentric with the roller axis. Ordinarily the cutter will not leave the rubber during any one trimming operation and a continuous ribbon will be formed. But the cut may be so shallow and the degree of eccentricity of the untrimmed surface so great that the cutter will just leave the uncut surface once during each revolution of the roller. In such a case, the strip 25 would be formed in short lengths.

The ribbon is completed and severed from the roller by the formation of the surface 32, the surface 31 being cut during the previous revolution of the roller. The curvature of the surfaces 31 and 32 is due to the fact that they are formed by the intersection of a circular knife edge and a cylindrical surface, the degree of curvature being determined by various factors including the relative sizes of the cutter and roller, and the spacing of the roller and cutter axes.

With the present method of slicing, it will be apparent that the angle at which the knife edge 24 enters and leaves the surface 31, cut during the previous revolution of the roller, corresponds to the angle at which the surfaces 30, 31 and 32 intersect. While this angle varies with cuts of different depths, as will be seen from Fig. 7, it is, in every instance, a sufficiently large angle to avoid the formation of a thin feather edge on the strip. Thus a clean cut is taken by the knife edge without compressing the rubber materially which latter condition would result in the formation of ragged edges on the strip 25 and lack of uniformity in the diameter of the trimmed surface.

The entry of the cutter at the desired angle and the formation of a narrow strip is made possible by offsetting the cutter and roller axes as above described. The spacing of these axes may be increased to some extent without effecting the accuracy and uniformity of the cut but should not be increased by an amount such as would result in a substantially wider strip having thin feather edges. While the cutter and roller axes might be spaced closer together, such a change in spacing should not be sufficient to lower the point 29 substantially below the plane 27; otherwise, the rubber being carried toward the active portion of the cutter blade would tend to wedge against the side surface of the cutter and thereby become compressed, tending to pass the knife edge without being uniformly cut to the required depth. The latter condition is avoided with the preferred arrangement above described and the ribbon formed has a substantially straight edge resulting in the formation of a true cylindrical surface on the roller.

Owing to the particular cross-sectional shape of the strip 25 resulting from the manner in which the cutter intersects the rough roller surface, the trimmed surface is not perfectly smooth but is formed with a narrow and extremely shallow spiral groove 33 defining a helical ridge 34 throughout the length of the roller. The depth and shape of the groove 33 will vary with the relative sizes and positions of the cutter and roller and with the rate at which the cutter is fed along the roller. The angle between the plane of rotation of the knife edge 24 and the roller is also a factor in determining the depth of the groove 33, the latter becoming deeper as the inclination of the cutter is increased. In order to form a shallow groove and thereby minimize the amount of buffing required to form a smooth surface on the roller, it is desirable to reduce the angle above referred to as much as possible at the same time allowing for proper clearance between the cutter and the trimmed surface of the roller.

Means is provided for bending the strip 25 away from the point at which it is completely formed and conveying the strip in a predetermined path away from the rotating parts so as to prevent the strip from wrapping around such parts and clogging the machine. For this purpose, a stream of fluid is discharged from a nozzle 35 against the strip 25 at and immediately beyond the point 28 at which, it will be observed, the transverse section of the strip is completely formed. In the present instance, the nozzle is directed downwardly in a direction generally longitudinally of the roller toward the trimmed end thereof and parallel to the cutter (see Fig. 1) but on a line offset with respect to the shaft 15 so as to carry the strip below the shaft. The strip is thus conveyed away from the cutter falling into a trough 36 formed by a casing 37 which constitutes a guard for the cutter.

To provide proper lubrication for enabling a clean cut to be taken by the knife edge, water preferably is employed as the pressure fluid and is supplied to the nozzle through a hose 38 supported by an arm 39 on the bracket 18 so as to travel with the cutter and therefore remain in proper position with respect to the cutter throughout the trimming operation. The volume of water used is large enough to wash the strip 25 along the trough 36 maintaining a substantial length of the strip under tension thereby leading the strip along a predetermined path out of the way of the rotating parts.

In the present instance, the trough 36 discharges into a receptacle 41 supported from the carriage 21. A pump 42 driven by an electric motor 43 withdraws the water from the receptacle, delivering the same continuously and under pressure to the hose 38. As the ribbon 25 and the water are discharged into the receptacle, the ribbon is retained upon a screen 44 from which it is removed from time to time.

Owing to variations in the depth of the cut taken and the degree of eccentricity of the rough surface of the roller, the stiffness of the strip 25 and therefore the position at which bending occurs under the force of the water jet may vary considerably. To compensate for such variation and avoid frequent adjustment of the nozzle, the latter is shaped so as to discharge the water over an area indicated in dotted outline in Fig. 4 and elongated in a vertical direction so that regardless of the position at which the strip tends to bend, the water jet will always impinge on the strip at the proper point.

In view of the accuracy with which the diameter of a roller can be reduced with the method above described, the amount of buffing with abrasive in order to produce a surface of the desired smoothness is reduced to a minimum. If desired, the buffing operation may be carried on simultaneously with the trimming operation. For this purpose, an abrasive carrying member such as a rotatable grinding disk 46 is mounted for movement longitudinally of the roller while in light contact with the trimmed surface thereof. Preferably, the disk is arranged on the side of the roller opposite the cutter and is adapted to contact the grooved roller surface a short distance behind the point at which the cutter acts.

Herein the disk 46 is fast on the shaft of an electric motor 47 mounted by a table 48 supported by the carriage 21 and adapted to be shifted toward and from the roller by turning a screw shaft 49. In this way, the buffing disk moves with the carriage and, when set to run in contact with the roller periphery, will remove the ridge 34 and reduce the roller to a true cylindrical surface during the slicing operation. The presence of a substantial amount of water on the freshly trimmed portion of the roller greatly increases the efficiency of the abrasive disk 46 enabling the ridge 34 to be removed completely at the same relatively high speed at which the roller is trimmed by the cutter.

In the operation of reducing a roller to the desired diameter with the apparatus above described, the cutter is first set to take a cut properly corresponding to the diameter to which the roller is to be finished. This is accomplished as shown in Fig. 3 by mounting on the tail-stock 10 a disk 45 corresponding in diameter to that to which the roller is to be reduced. The cutter is then moved to a position in which the leading edge is disposed opposite the disk 45 and the carriage shifted by means of the hand screw 22 until the edge of the cutter just contacts the disk. By manipulation of the hand screw 49, the disk 46 is then set in a similar way to correspond to the diameter to be formed. Next, the carriage is moved to the opposite end of the lathe bed after which the roller is mounted in the machine. The motors 16 and 43 are then started and the feed screw 23 rendered active with the roller rotating in a direction indicated by the arrow in Fig. 4. The remainder of the trimming operation occurs automatically, being complete after the cutter and the grinding disk 46 have moved throughout the length of the roller. Finally, the roller is removed from the machine and any further polishing that may be necessary is carried on in a buffing machine of well known construction.

By the method above described it will be apparent that a roller may be trimmed to the desired diameter in a single cut and at high speed and simultaneously reduced to a high degree of smoothness. Accordingly, the cost of trimming and finishing rubber rollers is reduced materially.

While the cutter, in the embodiment herein described, is mounted for bodily movement of its axis in a horizontal plane, it will be obvious this axis might be movable in any other plane extending longitudinally of the roller within the scope of the present invention and the recitation in the claims of the horizontal location of the plane is not to be construed as a limitation.

I claim as my invention:

1. A machine for trimming a cylinder composed of rubber or like material comprising, in combination, means supporting said cylinder for rotation on its longitudinal axis, a carriage movable longitudinally of said cylinder, a rapidly rotating circular knife blade mounted on said carriage and operable during movement thereof to slice a helical ribbon from the periphery of said cylinder, a liquid receptacle on said carriage, a trough adjacent said blade leading to said receptacle, a nozzle for discharging a stream of liquid against said ribbon adjacent the point of formation thereof, said stream acting to convey the ribbon along said trough, means acting to separate the liquid from said ribbon and allow the liquid to flow into said receptacle, and means for withdrawing liquid from said receptacle and delivering the same to said nozzle under pressure.

2. A machine for trimming a cylinder composed of rubber or like material comprising, in combination, means supporting said cylinder for rotation on its longitudinal axis, a carriage movable longitudinally of said cylinder, a rapidly rotating circular knife blade mounted on said carriage and operable during movement thereof to slice a helical ribbon from the periphery of said cylinder, a liquid receptacle on said carriage, a trough adjacent said blade leading to said receptacle, a nozzle for discharging a stream of liquid against said ribbon adjacent the point of formation thereof, said stream acting to convey the ribbon along said trough, and means including a power driven pump operable to withdraw liquid from said receptacle and deliver the same to said nozzle under pressure.

3. A machine for trimming a cylinder composed of rubber or like material comprising, in combination, means supporting said cylinder for rotation on its longitudinal axis, a rapidly rotating knife blade operable during movement along the cylinder to slice a helical ribbon from the cylinder periphery, a casing constituting a guard for said blade and providing a trough for conveying the ribbon away from the blade, means movable along the cylinder with said blade and directing a stream of liquid against said ribbon adjacent the point of formation of the ribbon and in a direction to carry the ribbon along said trough.

4. A machine for trimming a cylinder composed of rubber or like material comprising, in combination, means for supporting and rotating the cylinder on its longitudinal axis, a rapidly driven knife blade mounted for movement longitudinally of said cylinder and during such movement to slice the periphery of the cylinder along a helical path whereby to form a ribbon, and means providing a jet of liquid movable with said blade and directed toward said ribbon and transversely of the ribbon immediately in advance of the point of its complete formation whereby to bend the ribbon and convey the same away from the cylinder and said blade, the sectional area of said jet extending substantially beyond said point of formation so as to compensate for variations in the position at which the ribbon bends due to changes in the thickness of the ribbon.

5. A machine for trimming a cylinder composed of rubber or like material comprising, in combination, means for supporting and rotating the cylinder on its longitudinal axis, a rapidly driven knife blade mounted for movement longitudinally of said cylinder and during such movement to slice the periphery of the cylinder along a helical path whereby to form an elongated ribbon, and means providing a jet of liquid movable with said blade and directed toward said ribbon and transversely of the ribbon immediately beyond the point of its complete formation whereby to bend the ribbon and convey the same away from the cylinder and said blade.

6. The method of trimming a cylinder composed of rubber or like material comprising slicing a helical ribbon from the periphery of said cylinder and directing a stream of water against said ribbon transversely of the line of cutting thereof and adjacent the point of complete formation of the ribbon whereby to convey the completed ribbon away from the slicing means.

7. The method of reducing the diameter of a cylinder composed of rubber or like material comprising rotating the cylinder on its longitudinal axis, positioning a rapidly rotatable circular knife edge so that a segment of its periphery will intersect the peripheral surface of the cylinder with the chord of such segment disposed at an acute angle relative to a transverse plane through the cylinder and parallel to the axis of said knife, and causing relative bodily movement between said knife edge and the cylinder in a direction longitudinally of the latter and at a uniform rate.

8. The method of trimming and finishing a roller composed of rubber or like material which comprises slicing from the roller periphery a helical ribbon having a section which tapers toward opposite side edges of the ribbon leaving a helical ridge on the trimmed surface of the roller, and buffing off said ridge.

9. The method of trimming and finishing a roller composed of rubber or like material which comprises slicing from the roller periphery a helical ribbon tapering in thickness toward the side cut from the innermost portion of the roller whereby to leave a helical ridge on the trimmed surface, and buffing off said ridge.

10. The method of trimming and finishing a roller composed of rubber or like material which comprises slicing from the roller periphery a continuous helical ribbon of triangular cross-section having one uncut side surface.

11. The method of trimming and finishing a roller composed of rubber or like material which comprises slicing from the roller periphery a helical ribbon of triangular cross-sectional shape having one uncut surface and two cut surfaces intersecting said uncut surface at angles sufficiently large to avoid the formation of thin feather edges on said strip.

12. The method of trimming and finishing a roller composed of rubber or like material which comprises slicing from the roller periphery a helical ribbon of triangular cross-sectional shape having one uncut surface and two cut surfaces respectively intersecting said uncut surface at acute and obtuse included angles, and intersecting each other at a sharper acute angle.

13. The method of trimming and finishing a roller composed of rubber or like material which comprises slicing from the roller periphery a helical ribbon of triangular cross-section having a narrow uncut surface and two wider surfaces of different widths respectively intersecting said uncut surface at acute and obtuse included angles and intersecting each other at a sharper angle.

14. A machine for reducing the diameter of a cylinder composed of rubber or like material comprising, in combination, a power driven rotary blade having its axis offset from the axis of the cylinder and a circular knife edge slightly inclined relative to the cylinder and adapted to enter the periphery of the latter to a depth corresponding to the diameter to be formed, the leading edge of said cutter entering the material on the untrimmed diameter and passing out of contact with the material on the diameter to which the cylinder is to be trimmed, and means rotatably carrying said cylinder to present successive circumferential sections of the same to said cutter and simultaneously advancing the cutter at a uniform rate along the cylinder to present successive longitudinal sections to said cutter.

15. A machine for reducing the diameter of a cylinder composed of rubber or like material comprising, in combination, a power driven rotary blade having a circular knife edge slightly inclined relative to the cylinder and adapted to enter the periphery of the latter to a depth corresponding to the diameter to be formed, a segmental portion of the leading edge of said cutter entering said material on the untrimmed diameter and leaving the material on the diameter to which the cylinder is to be trimmed and at a point axially spaced behind the point of entry, and means rotatably carrying said cylinder and effecting relative longitudinal movement between the cylinder and said cutter.

16. A machine for reducing the diameter of a cylinder composed of rubber or like material comprising, in combination, a power driven circular knife having a tapering edge adapted during trimming to enter the periphery of said cylinder to a depth corresponding to the diameter to which the cylinder is to be reduced, said edge leaving the rubber at a point on the reduced diameter spaced from the point of entry both circumferentially and axially of the cylinder, means rotatably carrying said cylinder at a uniform rate to present successive circumferential portions of the cylinder to said knife, and means for feeding said knife at a uniform rate longitudinally of said cylinder.

17. A machine for trimming a cylinder composed of rubber or like material comprising, in combination, a rapidly rotating disk having its axis extending transversely of the axis of the cylinder and spaced therefrom a distance corresponding to the diameter to which the cylinder is to be reduced, means supporting said disk and cylinder for relative bodily movement of their axes in spaced parallel planes, said disk having a circular knife edge with a segment thereof intersecting the peripheral portion of the cylinder and passing out of contact with the material on a diameter less than that of the cylinder, means rotatably carrying said cylinder and means for effecting said relative bodily movement.

18. A machine for trimming a cylinder composed of rubber or like material comprising, in combination, a rapidly rotating disk having its axis extending transversely of the cylinder and a knife edge with a segmental portion adapted to enter the cylinder periphery to a depth corresponding to the diameter to which the cylinder is to be reduced, means supporting said disk and the cylinder for relative bodily movement of their axes in spaced parallel planes whereby said edge enters and leaves said material at points axially spaced along the cylinder, means rotatably carrying said cylinder, and means for effecting said relative bodily movement at a uniform rate.

19. A machine for reducing to a predetermined diameter a cylinder composed of rubber or like material comprising, in combination, a rapidly rotating disk having a knife edge positioned so that a segmental portion enters the periphery of said cylinder, means supporting said disk and cylinder for relative bodily movement of their axes in spaced parallel planes extending longitudinally of said cylinder.

20. A machine for trimming a cylinder composed of rubber or like material comprising, in combination, power driven means supporting and rotating said cylinder on its longitudinal axis in a horizontal position, a power driven horizontal shaft supported for bodily movement longitudinally of said cylinder, a cutter disk on said shaft having a circular knife-edge disposed in a vertical plane slightly inclined with respect to and making an obtuse angle with the untrimmed portion of the cylinder, the axis of said shaft being spaced above the cylinder axis a distance such that the leading edge portion of the blade enters the cylinder at a point substantially above a horizontal plane through the roller axis and leaves the roller at a point disposed above but closely adjacent the latter plane, and power driven means for moving said cutter longitudinally of said roller at a uniform rate.

21. A machine for reducing to a predetermined diameter a cylinder composed of rubber or like material comprising, in combination, a rapidly rotating disk having a knife edge, means supporting said disk and cylinder for relative bodily movement of their axes in parallel planes extending longitudinally of said cylinder, the spacing of said planes and of the disk relative to the roller axis being such that a segmental portion of said edge enters and leaves the periphery of the cylinder between said planes with the point of leaving disposed closely adjacent said plane through the cylinder axis.

22. A machine for reducing to a predetermined diameter a cylinder composed of rubber or like material comprising, in combination, a rapidly rotating disk having a knife edge, means supporting said disk and cylinder for relative bodily movement of their axes in parallel planes extending longitudinally of said cylinder, the spacing of said planes and of the disk relative to the roller axis being such that a segmental portion of said edge enters the periphery of said cylinder between said planes and leaves the material adjacent said plane through the cylinder axis, and means rotatably supporting said roller.

23. A machine for reducing to a predetermined diameter a cylinder composed of rubber or like material comprising, in combination, a power-driven disk having a knife edge rotatable in a vertical plane, means supporting said disk and cylinder for bodily movement of the axes in parallel horizontal planes with the plane through said disk axis disposed above the roller axis a distance such that a segmental portion of said knife edge enters and leaves the periphery of the cylinder between said planes, and means rotatably supporting said roller to rotate in a direction to carry the rubber upwardly past said segmental portion.

24. A machine for trimming and buffing a cylinder composed of rubber or like material comprising, in combination, means supporting and rotating said cylinder on its longitudinal axis, a power driven cutting disk mounted for bodily movement relative to said roller in a direction longitudinally of the latter and positioned to slice a helical ribbon from the periphery of the cylinder during such movement whereby to reduce the diameter of the cylinder, an abrasive element engageable with said surface of the cylinder on its reduced diameter and movable with said disk whereby to buff the reduced surface progressively during formation of said ribbon.

25. A machine for reducing the diameter of a cylinder composed or rubber or like material comprising, in combination, means supporting and rotating said cylinder on its longitudinal axis, a carriage mounted for movement at a uniform rate longitudinally of said cylinder, a power driven knife edge on said carriage positioned to slice a helical ribbon from the periphery of said cylinder during movement of said carriage whereby to reduce the diameter of the cylinder, an abrasive-carrying member supported by said carriage on the side of said cylinder opposite said knife edge and positioned for cutting engagement with the cylinder surface on its reduced diameter and at a point adjacent the portion being cut by said knife edge.

26. A machine for trimming and buffing a cylinder composed of rubber and like material comprising, in combination, a power driven cutting disk, means rotatably supporting said disk and cylinder for relative bodily movement of their axes in spaced parallel planes, said disk being positioned to slice a helical ribbon from the cylinder periphery during such relative movement and rotation of the cylinder whereby to reduce the diameter of the cylinder, and an abrasive element operable during said relative bodily movement to buff the cylinder surface on said reduced diameter.

27. A machine for trimming and buffing a cylinder composed of rubber and like material comprising, in combination, a power driven cutting disk, means rotatably supporting said disk and cylinder for relative bodily movement of their axes in spaced parallel planes, said disk being positioned to slice a helical ribbon from the cylinder periphery during such relative movement and rotation of the cylinder whereby to reduce the diameter of the cylinder, means providing a jet of liquid directed toward said disk adjacent the point of complete formation of said ribbon, and an abrasive element operable during rotation of the cylinder and said bodily movement to grind the cylindrical surface of reduced diameter, said element contacting the latter surface adjacent the point of slicing whereby the liquid retained on the surface is utilized as a lubricant in grinding.

28. The method of trimming and finishing a cylinder of rubber or like material which comprises slicing a helical ribbon of triangular cross-section from the periphery of said cylinder leaving a spiral ridge on the surface of reduced diameter, and buffing off said ridge progressively along said cylinder during the formation of said ribbon.

29. In a machine for slicing a ribbon-like helix from the periphery of a cylindrical rubber roller to trim the roller to a uniform diameter, the combination of means rotatably supporting said roller, a power driven rotary cutter having a circular peripheral knife edge and supported with its rotational axis extending transversely of and slightly inclined with respect to the roller axis and disposed in a plane parallel to the latter, a segment of said blade projecting into the cylinder defined by the roller periphery to the depth to which the roller is to be trimmed, and means for effecting relative bodily movement between said cutter and roller in a direction longitudinally of the latter.

30. In a machine for slicing a ribbon-like helix from the periphery of a cylindrical rubber roller, the combination of means for supporting and rotating said roller on its longitudinal axis, a circular knife edge rotatably supported with its rotational axis extending transversely of and in a plane parallel to the roller axis and a segment of its periphery projecting into the cylinder defined by the roller periphery to the depth to which the roller is to be trimmed, means for effecting relative bodily movement between said knife edge and said roller in a direction longitudinally of the latter, and power driven means for rotating said knife edge at a speed substantially greater than the speed of rotation of the roller.

31. In a machine for the purpose described, the combination of means for supporting and rotating a rubber roller, and a power rotated circular knife edge positioned to slice a ribbon-like helix from the periphery of the roller upon relative bodily movement of the roller and knife edge in a direction longitudinally of the roller, and means for effecting such relative movement.

32. In a machine of the class described, the combination of means for supporting a roller and rotating the same about its longitudinal axis, a circular knife edge disposed in a plane substantially parallel to the roller axis and spaced therefrom to enter and leave the roller upon its untrimmed and trimmed diameters respectively whereby to slice a helical ribbon of triangular cross-section from the periphery of the roller during relative movement of the knife edge and roller in a direction longitudinally of the latter while the roller is being rotated, and power means for rotating said knife edge.

33. In a machine of the class described, the combination of means for supporting a roller and rotating the same about its longitudinal axis, a circular knife edge disposed in a plane substantially parallel to the roller axis and spaced therefrom to enter and leave the roller upon its untrimmed and trimmed diameters respectively whereby to slice a helical ribbon of triangular cross-section from the periphery of the roller during relative movement of the knife edge and roller in a direction longitudinally of the latter while the roller is being rotated, and power means for rotating said knife edge at a speed substantially greater than the speed of rotation of the roller.

34. The method of reducing the diameter of a cylinder composed of rubber or like material comprising rotating the cylinder on its longitudinal axis, positioning a rapidly rotating circular knife edge with its rotational axis extending transversely of the cylinder axis and with a segment of the edge adapted to enter the cylinder periphery at an acute angle, and causing relative movement between the knife edge and cylinder longitudinally of the latter and at a uniform rate whereby to remove a helical ribbon from the periphery of the cylinder.

35. A machine for reducing the diameter of a cylinder composed of rubber or like material comprising, in combination, a power driven cutting element having a knife edge adapted during trimming to enter the periphery of the cylinder to a depth corresponding to the diameter to which the cylinder is to be reduced, said edge entering and leaving the material of the cylinder at points axially spaced along the cylinder, and means for effecting relative movement between the cylinder and said cutting element so that the latter will trim said cylinder to a uniform diameter.

36. A machine for trimming and buffing a cylinder composed of rubber or like material comprising, in combination, a power driven knife edged element, means for supporting said element and cylinder for relative bodily movement in the direction of the cylinder axis, said element being positioned to slice a helical ribbon from the cylinder periphery during such relative movement and rotation of the cylinder whereby to reduce the diameter of the cylinder, means providing a jet of liquid directed toward said element adjacent the point of complete formation of said ribbon whereby some of said liquid is retained on the trimmed cylindrical surface, and an abrasive means operable during rotation of the cylinder and said bodily movement to grind the cylindrical surface of reduced diameter, said means contacting the latter surface adjacent the point of slicing whereby the liquid retained on the surface is utilized as a lubricant in grinding.

37. In a machine for the purpose described, the combination of means for supporting and rotating a rubber or like roller, a power driven knife edge angularly positioned relative to both the longitudinal and circumferential dimensions of the roller periphery so as to slice a ribbon-like helix from the periphery of the roller upon relative bodily movement of the roller and knife edge longitudinally of the roller, and means for effecting such relative movement.

WELLS A. LIPPINCOTT.